G. W. PAYNE.
RADIATOR SHIELD.
APPLICATION FILED SEPT. 16, 1918.
1,327,730. Patented Jan. 13, 1920.
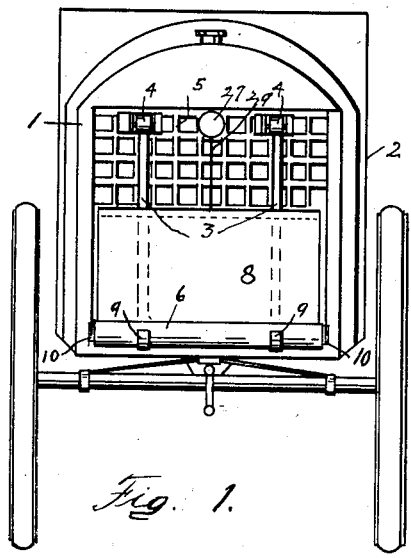
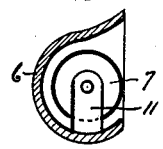
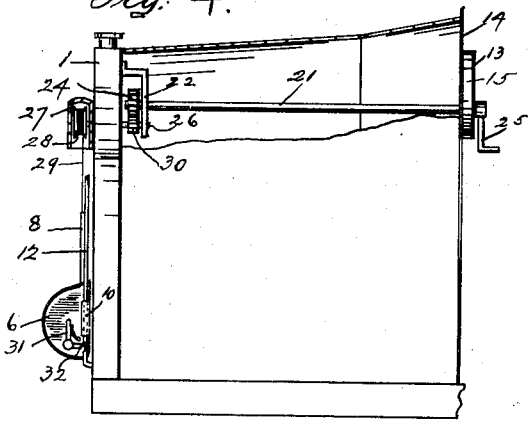
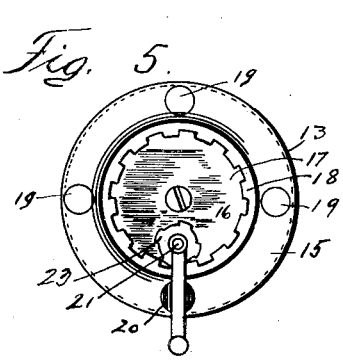
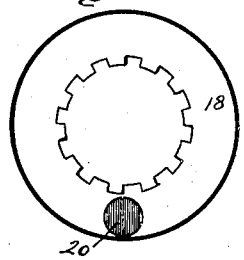
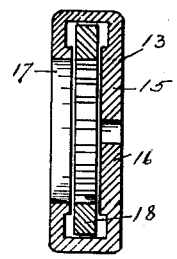
WITNESS:
INVENTOR.
George W. Payne.
BY M. E. Gillham.
ATTORNEY.

UNITED STATES PATENT OFFICE.

GEORGE W. PAYNE, OF KANSAS CITY, MISSOURI.

RADIATOR-SHIELD.

1,327,730.  Specification of Letters Patent.  Patented Jan. 13, 1920.

Application filed September 16, 1918. Serial No. 254,190.

*To all whom it may concern:*

Be it known that I, GEORGE W. PAYNE, a citizen of the United States, residing at Kansas City, in the county of Jackson and State of Missouri, have invented new and useful Improvements in Radiator-Shields, of which the following is a specification.

My invention relates, generally, to improvements in radiator shields for automobiles, and particularly, to the type of radiator shields shown and described in a former patent, issued to me on May 20, 1919, No. 1,304,089, and the object of my invention is first, to improve the construction of the shield by the provision of a housing for the shield and which may be universally applied to automobiles, and second, to improve the construction by the provision of attaching means which will permit elevating the device to render the crank accessible for cranking.

I attain these objects and advantages by means of the mechanism illustrated in the accompanying drawing in which—Figure 1, is a front elevation of an automobile radiator, and showing my invention applied thereto; Fig. 2, is a rear elevation of the housing, and showing the shield housed therein; Fig. 3, is a cross section through the housing, on the line III—III, in Fig. 2; Fig. 4, is a side elevation of the hood portion of an automobile, partly sectioned, and showing my invention operative; Fig. 5, is a top plan view of the indicator device; Fig. 6, is a plan view of the internal gear wheel forming part of the indicator device, and Fig. 7, is a transverse section of the indicator device.

Similar numerals of reference refer to corresponding parts throughout the several views.

The numeral 1, indicates a radiator front on an automobile 2. Arms 3, are suspended from the upper portion of the cellular filling of the radiator, by the hinges 4, which are clamped thereon by means of bolts which are passed through the hinges and through the openings in the cellular filling 5, and secures in place by plates, washers, nuts, at the inner side of the radiator. A trough-shaped housing 6, having mounted therein a spring actuated roller 7, provided with a flexible shield 8, is mounted on hooks 9, which are formed on the free end portions of the arms 3, and in such a manner that the opening in the trough-shaped housing shall be presented to the radiator front. The upper edge of the trough is formed to curve outwardly a little distance for the purpose of providing a spaced opening for the passage of the shield. A tube 10, is fixed on each end of the housing, and in such a manner that when the housing is in operative position, the tubes shall be disposed parallel with the radiator front and adapted to receive supporting arms hereinafter described. Brackets 11, are fixed on the inner side of the housing, adjacent the inner side of its ends, and are adapted to receive and support the spring roller 7, in the well known manner. The housing 6, constructed in the manner described, is well adapted to be received and supported alternately by the arms 3, and rods 12, which are mounted at the sides of the radiator front, and at points thereon adapted to allow the rods to enter the tubes 10; in the former case, the housing may be swung outwardly of the radiator, and in the latter case, the housing may be elevated on the rods, whenever it is desired to move the housing to provide opportunity to operate the crank.

An indicator 13, is secured on the face of the instrument board 14, said indicator comprising a circular case 15, having a solid back portion 16, and an opening 17, in its front side, and an internal gear wheel 18, slidably mounted therein and adapted to turn with a minimum of friction. Openings 19, are formed in the peripheral margin of the front portion of the case, at equi-distant points, through which openings the rim portion of the internal gear wheel 18, is visible. A red, or other colored spot 20, a little larger than the openings 19, is marked on the gear wheel 18, in such a manner that it shall be visible through said openings as the gear wheel turns. A drive shaft 21, is journaled adjacent its inner end in a hanger 22, which is mounted on the upper portion of the inner side of the radiator, and is extended inwardly therefrom through the instrument board and through the lower portion of the indicator, and projecting a little distance outwardly of the latter. A gear wheel 23, is mounted on the shaft 21, and in engagement with the internal gear wheel 18, and a gear wheel 24, is mounted on the inner end of the shaft. A crank 25, is mounted on the projecting end of the shaft, outwardly of the indicator. A stub shaft 26, is journaled at its one end in the hanger 22, and is extended through the cellular filling of the radiator and its projecting end portion journaled in a housing 27, provided with facility for receiving a drum 28, mounted on the drive shaft, upon which drum, a cable 29 is wound and connected with the shield 8. A pinion 30, is mounted on the stub shaft and in engagement with the gear wheel 24.

To apply my invention to the radiator front of an automobile, the arms 3, are suspended from the upper portion of the cellular filling, by the hinges 4, which are clamped on the filling, by means of plates, not shown, disposed rearwardly of the hinges and on the inner side of the filling. If the radiator front is not adapted to receive the arms mentioned, the rods 12, may be employed to carry the housing 6. Either form of attaching means may be used, since each provide quick and ever ready means for making the cranking of the car possible, by moving the housing away from the crank. To draw the shield, the crank 25, is turned to the right, when the drive shaft is turned, the gear wheel 24, thereon driving the pinion 30, on the stub shaft 26, and thereby the drum 28, is revolved and the cable 29, is wound thereon, and drawing the shield upwardly to the desired point. When the crank 25, is turned, the pinion 23, drives the internal gear wheel 18, and the spot 20, appearing at the opening 19, in the top or sides of the case 15, the shield will have been drawn, one quarter, one half, or three quarters of the height of the radiator filling. The crank may be detained in any position by means of ratchet wheel and dog, or by any other suitable detaining means, in the event the spring reaction of the roller 7, requires the detention of the crank. If the crank is turned in the reverse direction the reaction of the spring in the roller 7, will operate to house the shield. A spring actuated dog 31, is mounted on each end of the housing 6, and is adapted to engage a notch 32, as shown in Fig. 4, to hold the housing 6 in place. Although I show notches on the rods 12, to receive the dogs, it is understood that the rods may be provided with lugs or other suitable stops for the same purpose.

Having described my invention what I claim is—

In a radiator shield for automobiles, the combination with a radiator having cellular filling, of arms hingedly suspended from the cellular filling, a trough-shaped member supportingly engaged by said arms, a spring actuated shade roller mounted in said trough-shaped member and provided with an extensible shield, a stub shaft revolubly mounted on the radiator and provided outwardly of the radiator with a drum having a cable attached to the shield and inwardly of the radiator with a pinion, a revolubly mounted shaft having a gear wheel in engagement with the pinion on said stub shaft, and means for turning said last mentioned shaft.

Kansas City, Missouri, September 10th, 1918.

GEORGE W. PAYNE.

Witnesses:
A. L. GOODNIGHT,
JOHN C. STEARNS.